US011883945B2

(12) United States Patent
Panosian et al.

(10) Patent No.: US 11,883,945 B2
(45) Date of Patent: Jan. 30, 2024

(54) FOLDABLE WORKBENCH

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

(*) Notice: Subject to any disclaimer, the term of this patent is extended or adjusted under 35 U.S.C. 154(b) by 0 days.

(21) Appl. No.: 17/719,048

(22) Filed: Apr. 12, 2022

(65) Prior Publication Data

US 2023/0373077 A1 Nov. 23, 2023

(51) Int. Cl.
*B25H 1/04* (2006.01)

(52) U.S. Cl.
CPC .................................... *B25H 1/04* (2013.01)

(58) Field of Classification Search
CPC ...................................................... B25H 1/04
See application file for complete search history.

(56) References Cited

U.S. PATENT DOCUMENTS 4,154,435 A 5/1979 Alessio
4,155,386 A 5/1979 Alessio
5,816,374 A * 10/1998 Hsien .................. A45C 13/262 190/115
6,196,534 B1 3/2001 Fortin
6,595,251 B2 7/2003 Ayala
6,748,987 B2 6/2004 Ayala
6,848,684 B2 2/2005 Fortin
6,883,793 B2 4/2005 Fortin
7,048,021 B2 5/2006 Ayala
7,232,120 B2 6/2007 Campbell
7,814,947 B2 10/2010 Ayala
8,167,011 B2 5/2012 Quiram
(Continued)

FOREIGN PATENT DOCUMENTS

AU 532153 B2 6/1980
AU 752506 B2 3/2001
(Continued)

OTHER PUBLICATIONS

Zhang Xiangliang Publication Aug. 10, 2021 retrieved translation from Google Patents: https://patents.google.com/patent/CN213909016U/en?oq=CN213909016U (Year: 2021).*

*Primary Examiner* — Don M Anderson
*Assistant Examiner* — Christopher Soto
(74) *Attorney, Agent, or Firm* — Farjam Majd; ARJOMAND LAW GROUP

(57) ABSTRACT

A transportable workbench is disclosed the legs of which are easily manipulated and are folded under its top part. With the same ease the legs may be unfolded and erected to create a work-table for working in construction sites and in temporary work places. Each workbench has a telescopic moveable handle and corresponding mechanisms that translate the movements of the handle into movements of the workbench legs. Each workbench also has two push-buttons or actuators which help locking the moveable members of the workbench in various desired positions. Additionally, the tops of the workbenches have different slots and holes for attaching different power and traditional tools to the workbenches and are marked for various measurements and/or calculations which eliminates the need to use some basic tools while working on top of the workbench.

23 Claims, 16 Drawing Sheets

(56) References Cited

U.S. PATENT DOCUMENTS

| | | | | |
|---|---|---|---|---|
| 8,191,449 | B2 | 6/2012 | Wiezorek | |
| 8,740,207 | B2 | 6/2014 | Lawrence | |
| 9,272,345 | B2 | 3/2016 | Ayala | |
| 9,278,446 | B2 | 3/2016 | Lifshitz | |
| 9,347,229 | B2 | 5/2016 | Ken-Dror | |
| 9,371,954 | B2 | 6/2016 | Lifshitz | |
| 9,636,819 | B2 | 5/2017 | Lifshitz | |
| 9,776,319 | B2 | 10/2017 | Schell | |
| 10,065,304 | B2 | 9/2018 | Bensman | |
| 10,092,089 | B1 * | 10/2018 | Yuan | A47B 3/002 |
| 10,093,017 | B2 | 10/2018 | Birnbaum | |
| 10,343,274 | B2 | 7/2019 | Katz | |
| 10,357,874 | B2 | 7/2019 | Engvall | |
| 10,549,417 | B2 | 2/2020 | Ursell | |
| 10,562,174 | B2 | 2/2020 | Omry | |
| 2013/0140110 | A1 | 6/2013 | Ken-Dror | |
| 2016/0250745 | A1 | 9/2016 | Lifshitz | |
| 2018/0255919 | A1 * | 9/2018 | Swartz | A47B 9/12 |
| 2019/0001481 | A1 * | 1/2019 | Faibish | B25H 1/04 |
| 2019/0011481 | A1 | 1/2019 | Faibish | |
| 2019/0047135 | A1 * | 2/2019 | Zhu | B25H 1/16 |
| 2019/0291263 | A1 | 9/2019 | Fuller | |
| 2020/0009706 | A1 | 1/2020 | Omry | |
| 2020/0016737 | A1 | 1/2020 | Omry | |
| 2020/0039054 | A1 | 2/2020 | Baruch | |

FOREIGN PATENT DOCUMENTS

| | | | | |
|---|---|---|---|---|
| AU | 2013231194 | A1 | | 9/2014 |
| CN | 209565553 | U | | 11/2016 |
| CN | 213909016 | U | * | 8/2021 |
| EP | 1410881 | A2 | | 10/2002 |
| EP | 1712335 | A2 | | 10/2006 |
| EP | 1958737 | A1 | | 8/2008 |
| WO | WO2017083713 | A1 | | 5/2017 |

* cited by examiner

FOLDABLE WORKBENCH

CROSS-REFERENCE(S) TO RELATED APPLICATION(S)

None.

TECHNICAL FIELD

This application relates generally to work tables. More specifically, this application relates to a workbench with foldable legs for ease of deployment and also for storage and transportation.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
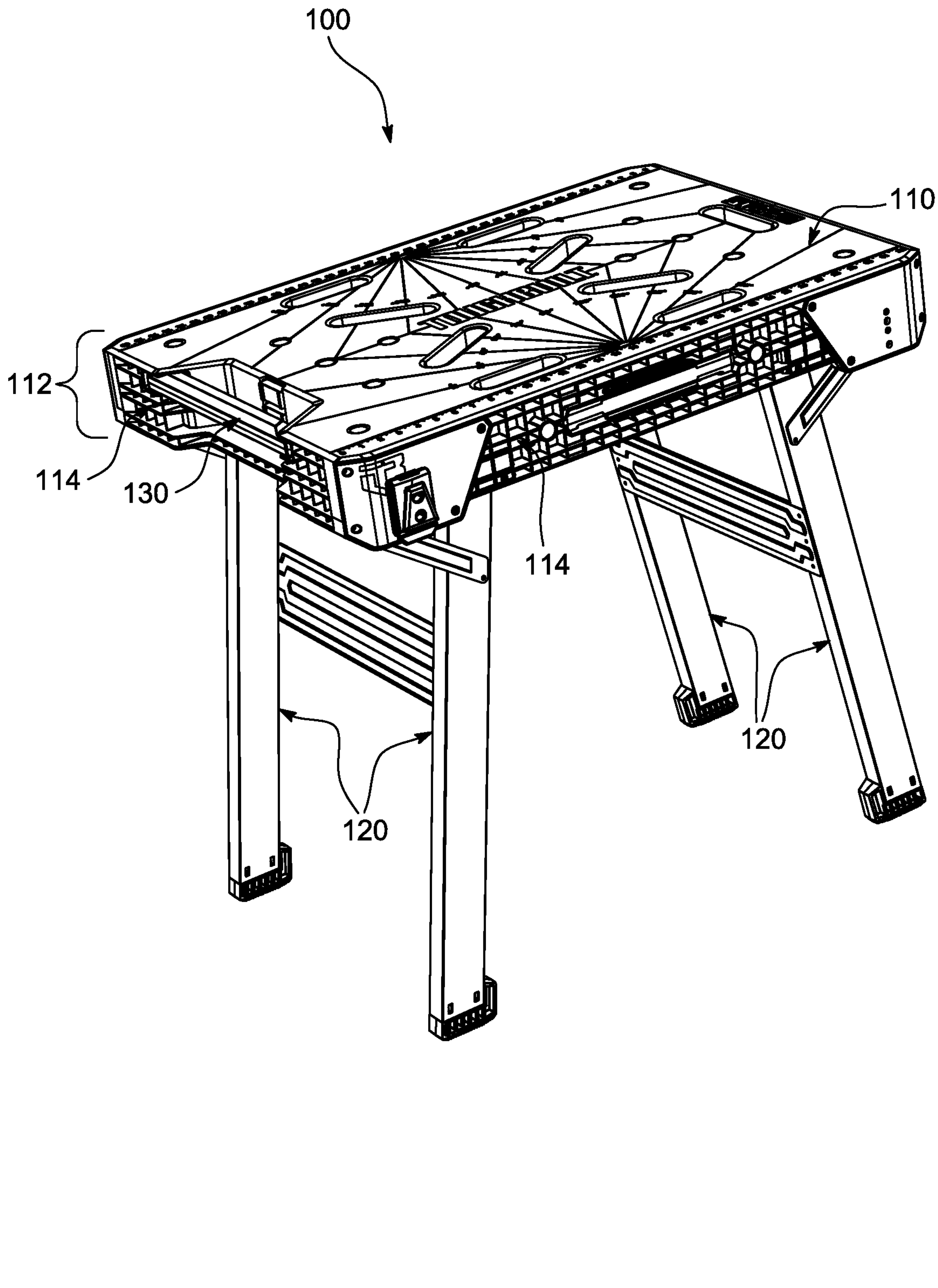
FIG. 1 shows a perspective view of disclosed example workbench.

While the present disclosure is described with reference to several illustrative embodiments and example devices described herein, it should be clear that the present disclosure should not be limited to such embodiments. Therefore, the description of the embodiments provided herein is illustrative of the present disclosure and should not limit the scope of the disclosure as claimed. In addition, while the following description references specific mechanisms for folding and unfolding the workbench legs and locking them in place, it will be appreciated that the disclosure may be applicable to other types of mechanisms.

Briefly described, a system and a method are disclosed for transportable workbenches with easily foldable and unfoldable legs that may be locked in both open and closed positions and in several other positions in between. With the mechanisms used in this disclosure, the workbench legs are tightly and efficiently fitted in the space under the workbench top. The workbench has a telescopic and moveable handle/grip and corresponding mechanisms that translate the movements of the handle/grip into movements of the workbench legs. The telescopic handle includes two parts; a linkage part and a handle part. The linkage part, as will be described below in detail, is attached to the workbench legs, and any movement of the linkage part is translated into movements of the workbench legs. On the other hand, the handle part is merely for moving the linkage part, which is not easily accessible. The handle part moves telescopically inside the linkage part and locks to the linkage part when the telescopic system of the handle is fully expanded. When there is no need for changing the position of the workbench legs, the handle part can be unlocked from the linkage part and be collapsed into the linkage part to save space. Each workbench also has a first push-button or actuator that helps lock the moveable members of the workbench in various desired positions, including the full-folded and the full-unfolded positions, and a second push-button or actuator that unlocks the handle part from the linkage part and helps to retract the handle part and collapse the telescopic handle. Additionally, the top of the workbench (the tabletop) has different slots and holes for attaching different power and traditional tools and is marked for various measurements and/or calculations that replace some basic tools while utilizing the workbench.

Those skilled in the art will appreciate that the orientation of various components or motion of various parts are with respect to one or more reference points on the workbench. Specifically, "up," "top," "above," and other such terms are used to indicate a direction from the free end of the workbench legs towards the work surface of the workbench (see FIG. 1, reference 110, described below). Accordingly, terms such as "down," "under," "underneath," "bottom," "below," and other similar terms are used to indicate a direction from the working surface toward the free end of the workbench legs. Similarly, terms such as "left," "right," "front," "back," "inward," "outward" and other such terms are defined with respect to one or more components or points on the workbench. Specifically, the location of the handle of the workbench is the front of the workbench, and the opposite edge of the workbench is the rear end of the workbench. A forward direction is defined as the direction extending from the rear of the workbench towards its front. A backward direction extends from the front of the workbench towards its rear. A horizontal orientation or direction is defined as a surface or line being parallel with the working surface of the workbench, and a vertical orientation is defined as being substantially perpendicular to the working surface of the workbench, even if the workbench itself is not oriented in a horizontal direction with respect to the gravitational field of the earth.

FIG. 1 shows a perspective view of an example workbench 100. In this illustrated embodiment, the workbench 100 has four legs 120, a top part 110, and a push-pull handle 130. In this embodiment the top 110 is in the form of a hollow or open box 112 without a bottom plate/surface. The box 112 has a top 110 and side walls 114 and has the potential to accommodate the legs 120 within it when the legs 120 are folded/closed. As is seen in this sketch, the surface of the top 110 has premanufactured slots and holes for the attachment of various tools and is accurately marked for measurement and positioning of tools and materials and/or basic engineering calculations.

In various embodiments, box 112 may be a box with all surfaces or a box frame with only a top surface or a box frame with a top surface and any other desired surface. An example of a box frame is a cage the members of which are located at the edges of the imaginary box or in other words, at the cross-sections of the imaginary surfaces of the box.

Figure 2:
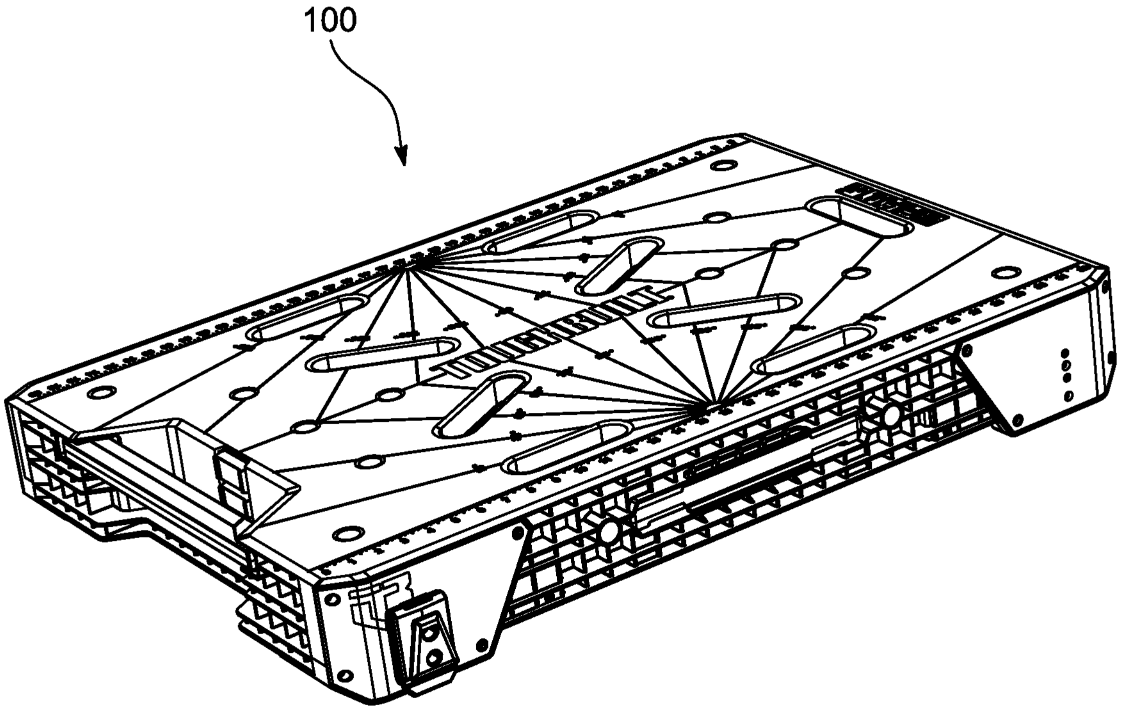
FIG. 2 shows a perspective view of the example workbench of FIG. 1 in a closed or folded position.

FIG. 2 shows a perspective view of the workbench 100 while its four legs 120 are folded under the top 110 (not visible in this figure)—inside box 112—and the handle 130 is pushed all the way back.

Figure 3:
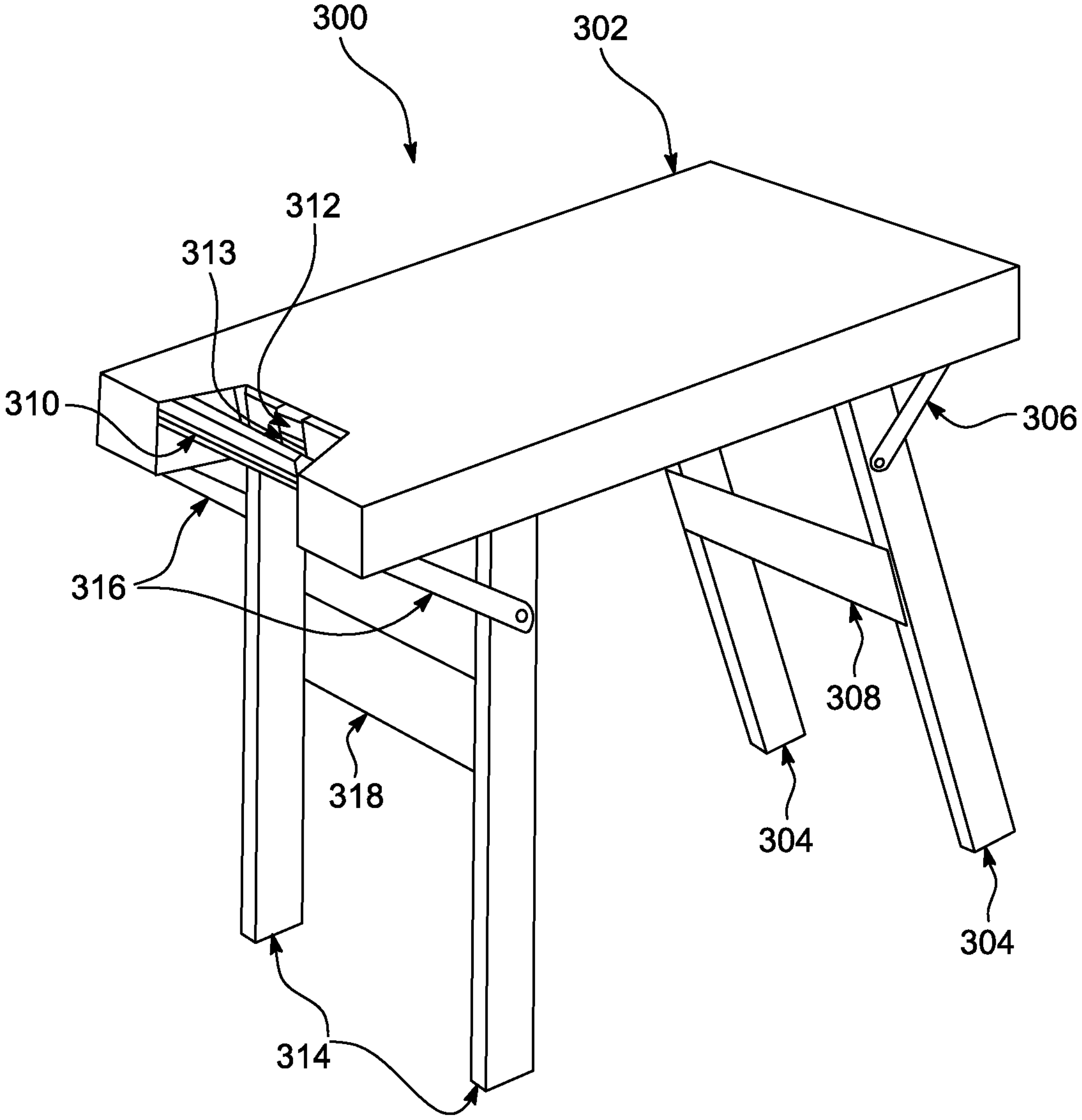
FIG. 3 illustrates some of the components of the disclosed example workbench.

FIG. 3 shows more details in an example of workbench 300, which is similar to the workbench 100. In this figure, the workbench 300 has two back legs 304 and two front legs 314; a top/tabletop 302; a push-pull handle/grip 310; the locking and unlocking push-buttons/actuators 312 and 313; an optional connector 308 that rigidly connects the legs 304 together; an optional connector 318 that rigidly connects the legs 314 together; linkages (side-bar or additional bar) 306, each of which form a two-bar linkage with each leg 304; and linkages (side-bar or additional bar) 316, each of which form a two-bar linkage with each leg 314. The linkages 306 and 316 help the legs 304 and 314, respectively, be placed in more desired and better positions under the top 302 when folding/closing or unfolding/opening the workbench legs 304 and 314. As noted above and shown in this figure, the front legs 314 are those closest to the push-pull handle 310.

Figure 4A:
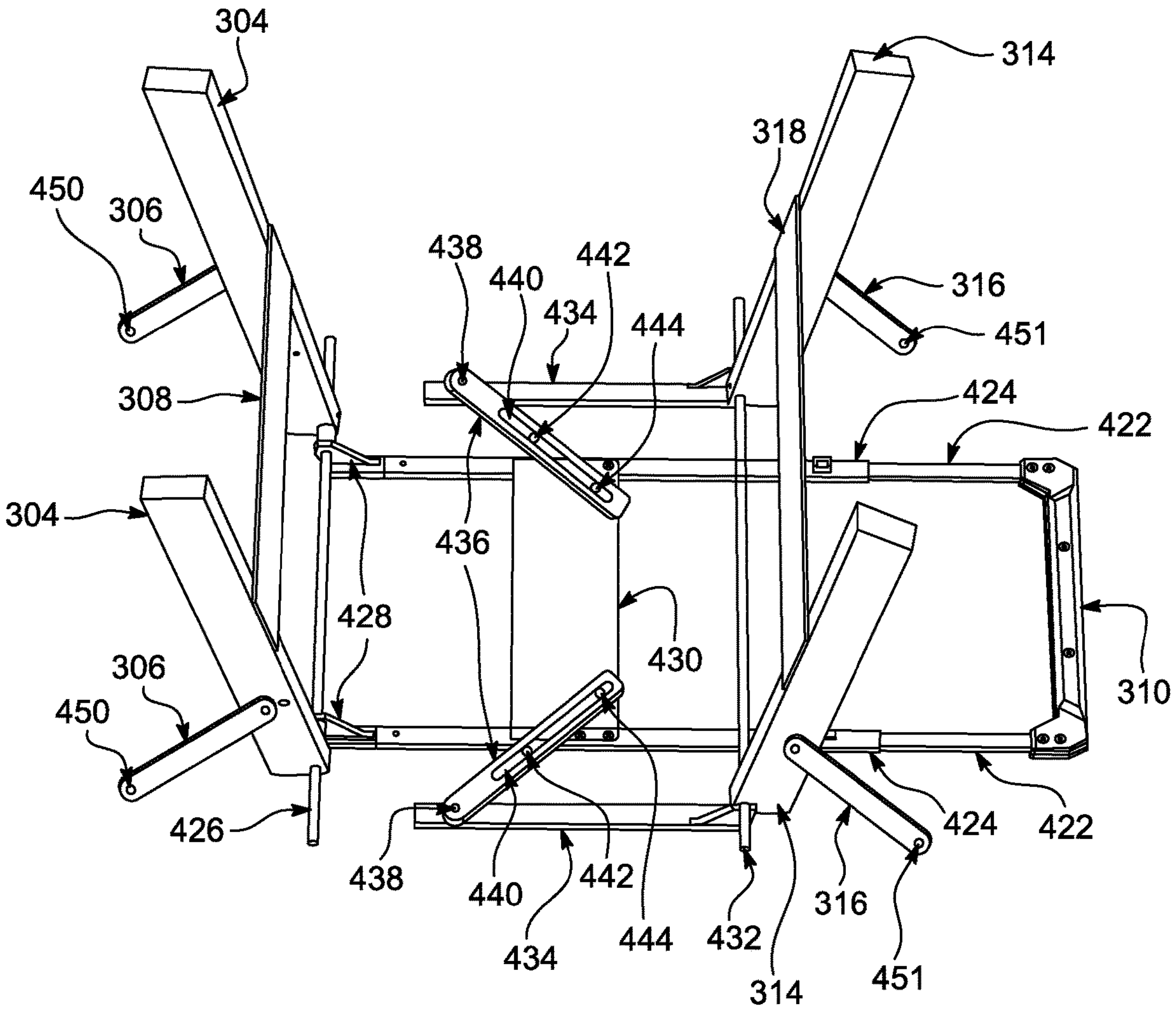
FIG. 4A illustrates more details of the example workbench of FIG. 3.

FIG. 4A illustrates more details of the example workbench 300 in an upside-down position. Some of the components in this figure have been introduced in the description of FIG. 3, the functions of which components will be further explained in this and the following paragraphs. The grip/handle 310 is rigidly attached to the two linear members 422 and collectively forms the handle part of a telescopic handle subsystem. The two linear members 422 move telescopically within the two linear members 424, which form the linkage part of the telescopic handle subsystem. The linear members 422 can be locked and unlocked with respect to the linear members 424 in circumstances that will be discussed later. The movements of handle 310, linear members 422, and linear members 424 are limited to linear movements in a single plane substantially parallel to the plane of the top 302.

Each of the four linkages 306 and 316 are rotatably pinned at one of their ends 450 and 451, respectively, to the top box 112, and their axis of rotations are substantially parallel to the plane of the top 302. In various embodiments the axis of rotations of linkages 306 are aligned together and the axis of rotations of linkages 306 are also aligned together and the axis of rotation of linkages 306 is parallel to the axis of rotation of linkages 316. The pins attaching linkages 306 and 316 to box 112 do not move with respect to box 112. Each of the other ends of the four linkages 306 and 316 is rotatably pinned to a desired point between the two ends of each leg 304 and 314. As shown in FIG. 4A, one end of leg 304 is rotatably pinned by sliding-rod/rod 426 to linear member 424. In this figure the two parts 428, which are fixed to the linear members 424, facilitate the rotatable attachment of legs 304 to the linear members 424. The two ends of rod 426 move in two linear slots deployed on two opposite sides of box 112, wherein the two slots are substantially parallel to the top 302 of the example workbench 300.

As a result of the described geometric relationships, each of the two linkages 306 along with each of the corresponding leg 304 form a two-bar linkage in an imaginary plane that in some embodiments is substantially perpendicular to the top 302. One end of these two-bar linkages is pinned to box 112 at point 450 and the other end of these two-bar linkages moves in a linear slot substantially parallel to the top 302. With this arrangement and with appropriate sizing of different parts of these two-bar linkages, if rod 426 is pushed toward point/pin 450, the legs 304 will fold, enter, and lie in box 112. On the other hand, if rod 426 is pulled away from point/pin 450, legs 304 will unfold and will rise up from box 112. Movements of rod 426 are directly tied to the movements of the linear members 424, which themselves are moved by handle 310. Therefore, pulling of the handle 310 can result in the unfolding of legs 304 and pushing of the handle 310 can result in the folding of legs 304 into the box 112.

In various embodiments the workbench may have one front and/or one back leg, for example in the shape of an "L", an inverted "T", or any other shape that makes the workbench stable on the ground with one front and/or one back leg.

Figure 4B:
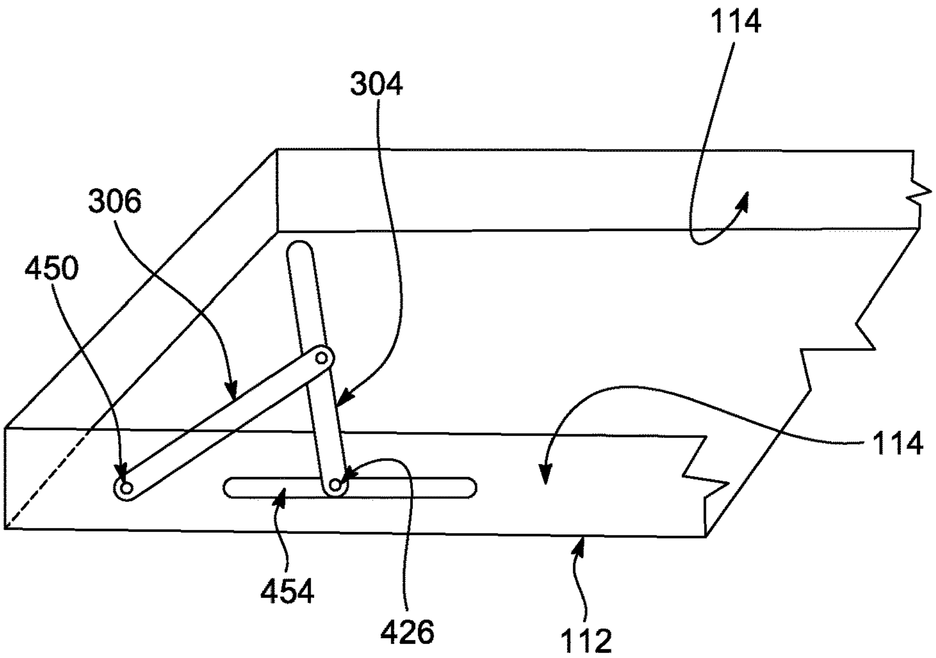
FIGS. 4B and 4C illustrate an example two-bar linkage mechanism for opening/unfolding and closing/folding the workbench legs.
Figure 4C:
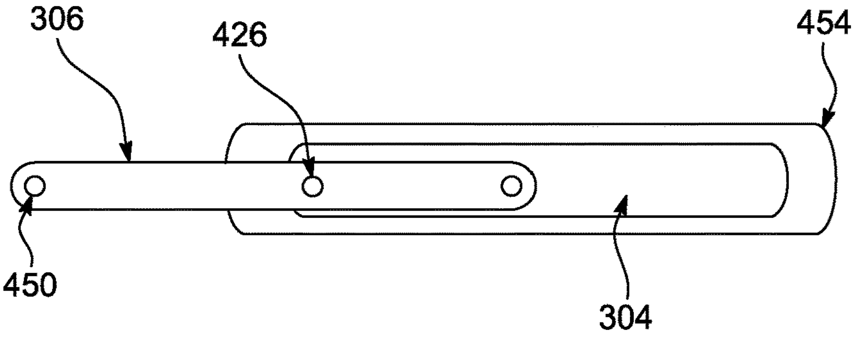

FIGS. 4B and 4C illustrate an example two-bar linkage mechanism for opening and closing of the workbench legs 304 and 314. The example two-bar linkage of FIG. 4B shows the basic relationship of legs 304, linkages 306, pins 450, rod 426, and slots 454, which in this embodiment are positioned in the walls 114 of box 112. In this embodiment, rod 426 can move within slots 454 but pins 450 are fixed to the walls 114 of the box 112. If we assume that pins 450 and rod 426 and linkages 306 and 304 are merely two-dimensional, then the components of each of these two-bar linkages and the corresponding slot 454 are all within the plane of wall 114. In practice these components and the slot 454 are on several substantially parallel planes, one of which is the plane of wall 114.

FIG. 4C shows the same two-bar linkage of FIG. 4B in which rod 426 is pushed toward pin 450 to fold leg 304 and bring it inside box 112.

The mechanism of opening and closing or folding and unfolding legs 314 and 304 are very similar. In the case of legs 314, one end of linkages 316 is rotatably fixed to wall 114 by pins 451 and the other end of linkages 316 is rotatably fixed to leg/linkage 314 at a calculated and designed distance from the first end of legs 314. In this case, a sliding-rod/rod 432 is attached to the first end of legs 314 and moves in slots 456 formed in the opposite walls 114 of box 112, similar to the slots 454 in the case of legs 304. A difference between the mechanism of movements of legs 304 and legs 314 is that rod 426 of legs 304 is directly attached to the linear members 424, while rod 432 of legs 314 is connected to the linear member 424 via direction-reversing members. As will be discussed later in more detail, this difference causes rods 426 and 432 to move in opposite directions as a result of any movement of handle 310 and therefore legs 304 and 314 will fold and unfold in opposite directions.

The mechanism for pulling rod 426 away from pin 450, which results in the unfolding of legs 304 is relatively simple because rod 426 is attached to the ends of the linear members 424 and by pulling handle 310 rod 426 is pulled away from pin 450. However, for pulling rod 432 away from pin 451, rod 432 must move in the opposite direction of the movement of handle 310. This is accomplished by members 436 (elongated member/bar) which rotate around pins 442 that are fixed to box 112. Members 436 rotate in a plane substantially parallel to the top plane of box 112. As a result, when one end of members 436 is pushed in any direction, the other end moves in the opposite direction. Each member 436 and its corresponding pin 442 form the building block of a movement-reversing-mechanism. The pulling and pushing of handle 310 are transferred to one end of members 436 through the pins 444 which are fixedly attached to the plate 430 which itself is fixedly attached to the linear members 424. With this arrangement if handle 310 is pulled or pushed, pins 444 move in the same direction as handle 310. In contrast, when handle 310 is pulled or pushed, pins 438 move in the opposite direction to handle 310 and pins 444. Slots 440 within members 436 merely compensate for the change in the distances between pins 438, 442, and 444 during the rotations of members 436. Rod 432 is attached to the pins 438 by means of the solid members 434 and follows the movements of pins 438. In this embodiment members 436 are rotatably pined to the members 434 by pins 438, and pins 442 and 444 move in slots 440. In other embodiments members 436 may be rotatably pined to the plate 430 and the pins 438 and pins 442 move in the slots 440. In various embodiments members 436 may be rotatably pined by pins 442 and pins 438 and pins 444 move in two slots on both sides of pins 442. In yet other embodiments all pins 438 and 442 and 444 may move inside the slots 440. The combination of the mentioned parts forms a movement-reversing-mechanism. The disclosed system that folds and unfolds the workbench legs does not employ a rack-and-pinion or any gear-based mechanism.

Figure 5:
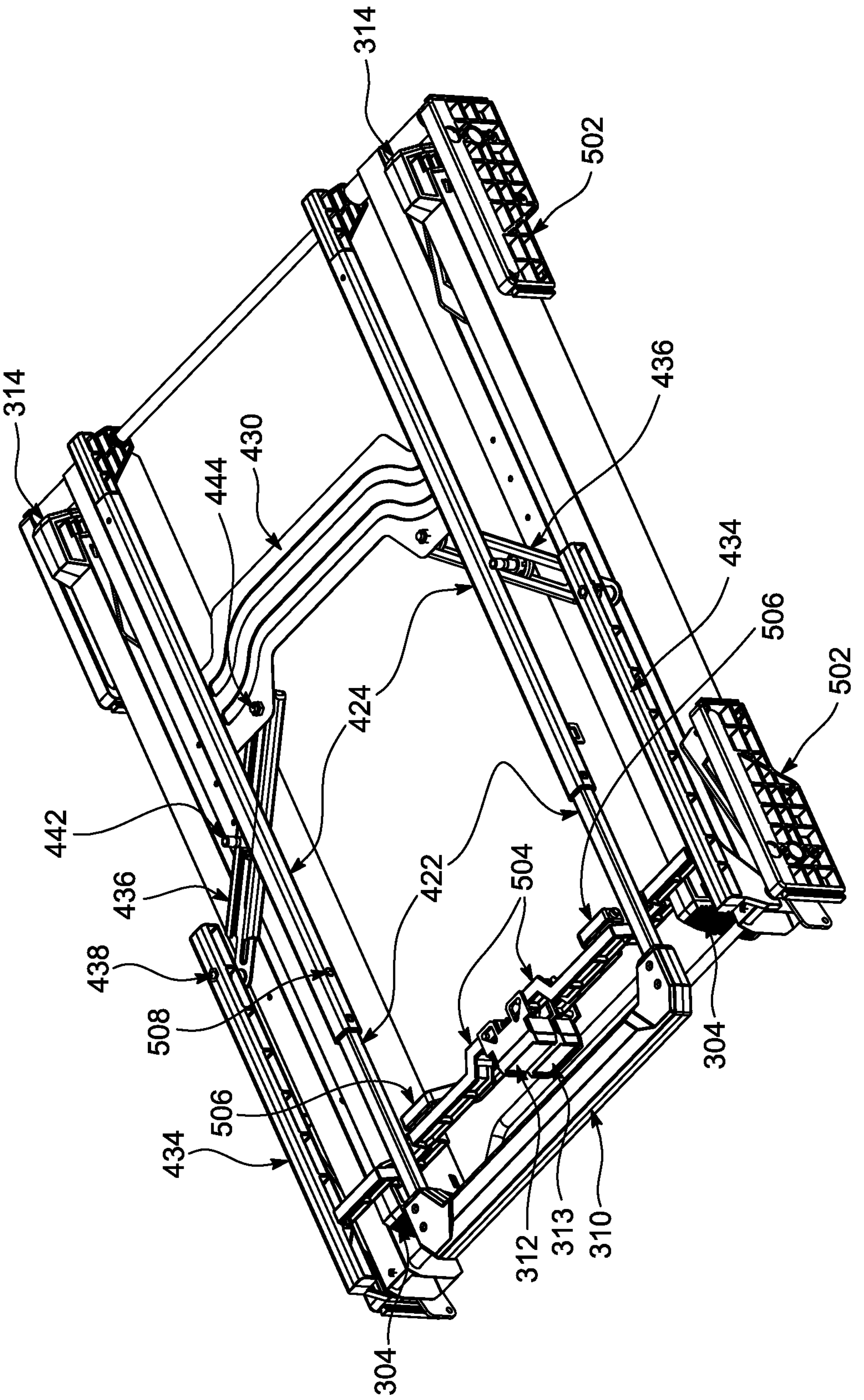
FIG. 5 illustrates more details of the example workbench of FIG. 3 in a folded position while the top of the workbench is omitted for clarity.

FIG. 5 is a top view of workbench 300, wherein, except for items 502 which are parts of the side walls 114 of the box 112 the rest of the top box 112 is removed for clarity. FIG. 5, in addition to the components shown in FIG. 4A, illustrates two useful mechanisms for locking and unlocking legs 304 and 314 in either folded or unfolded or other intermediate positions and for locking and unlocking the linear members 422 with respect to the linear members 424. While the functions of these mechanisms are briefly described in this and the next paragraph, the details of the mechanisms will also be discussed in depth in the following paragraphs.

Here the two arms 504 (locking and unlocking-arms), which are moveably connected to the actuator 312 (first switch), lock and unlock legs 304 and 314 in different positions. In the default position, as illustrated in FIG. 5, both arms 504, which are spring-loaded, are extended outwardly and are engaged with legs 304 and solid members 434 to lock and prevent legs 304 and 314 from unfolding. This also prevents any movement of the linear members 424 and consequently prevents handle 310 from being able to unfold legs 304 and 314. To unfold legs 304 and 314, one must push actuator 312 to retract retraction arms 504, release legs 304 and solid members 434, and then pull handle 310 out. Actuator 313 (second switch) unlocks the linear members 422 from the linear members 424. As mentioned before, when the linear members 422 are pulled all the way out of the linear members 424 and the telescopic handle system 310 is fully extended, a simple mechanism will lock the linear members 422 to the linear members 424 and the telescopic handle system 310 remains in the fully expanded state until push-button 313 is pressed. Pressing the push-button 313 enables linear members 422 to travel back into linear members 424 and reduce the overall length of telescopic handle system 310, when not in use. When handle 310 is pulled all the way out, spring loaded pins 508, which are integral parts of the linear members 422, engage a hole in the linear members 424 and lock the linear members 422 to the linear members 424. To collapse the telescopic handle system 310 and push back the linear members 422 into the linear members 422, for example after unfolding of the legs 304 and 314, one needs to depress the actuator 313 and extend arms 506 outwardly to push pins 508 into the linear members 422 and unlock the linear members 422 from the linear members 424. Collapsing the telescopic handle system helps with the transportation and storage of the workbench.

Figure 6:
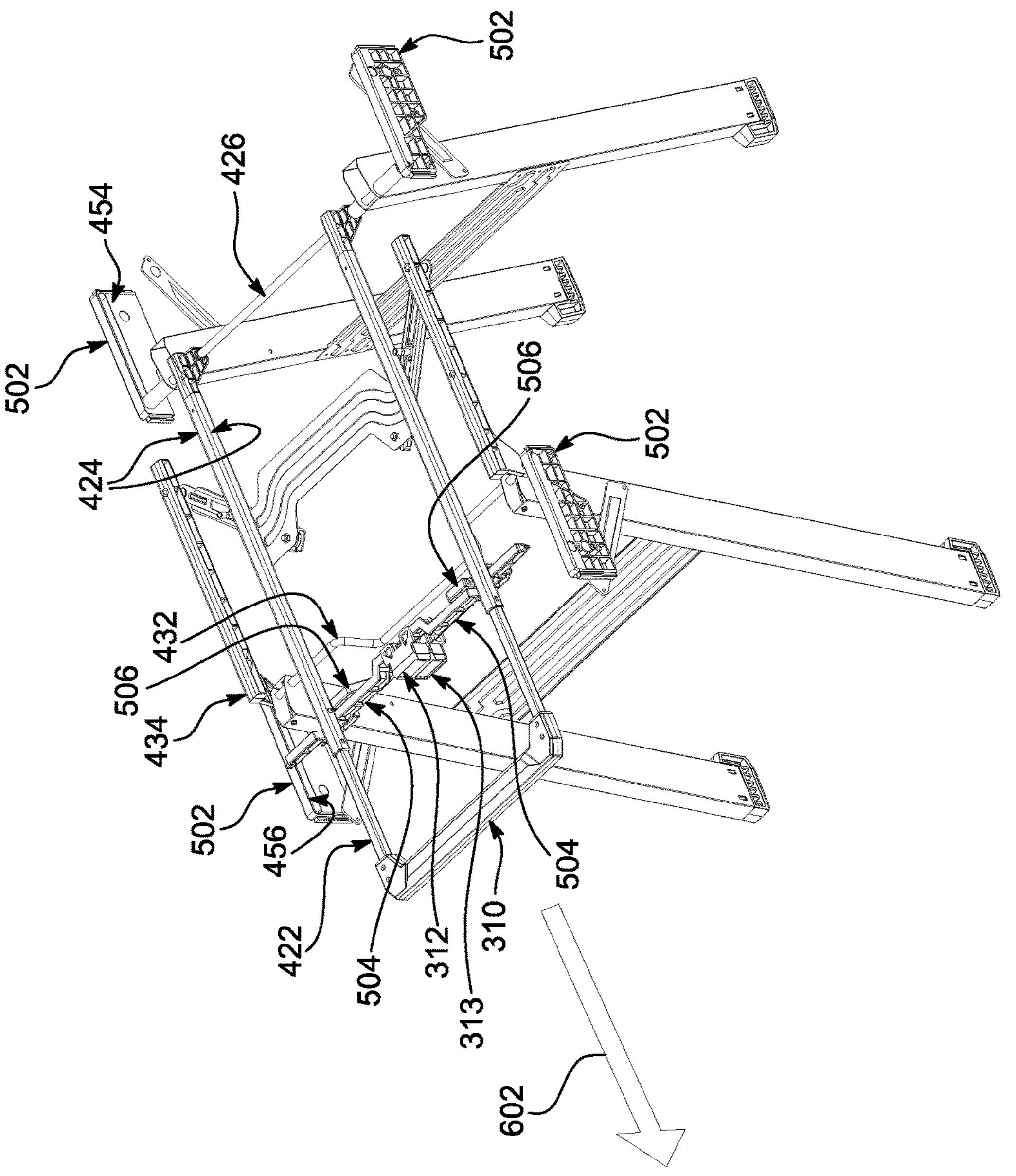
FIG. 6 shows the example workbench of FIG. 5, in an open or unfolded position.

FIG. 6 shows the workbench 300 from top in an unfolded position but without the tabletop 302, for clarity and ease of explanation. As can be seen in FIG. 6, handle 310 is pulled in the direction 602 which has resulted in pulling pin/rod 426 in the same direction 602. The movement of rod 426 is guided by slot 454. At the same time, as discussed previously, pin/rod 432 moves in an opposite direction and its movement is guided by slot 456. The movements of the two rods 426 and 432 toward each other cause legs 304 and 314 to unfold and be automatically locked in place by spring-loaded arms 504 that engage the linear members 424 and stops their movements.

Figure 7:
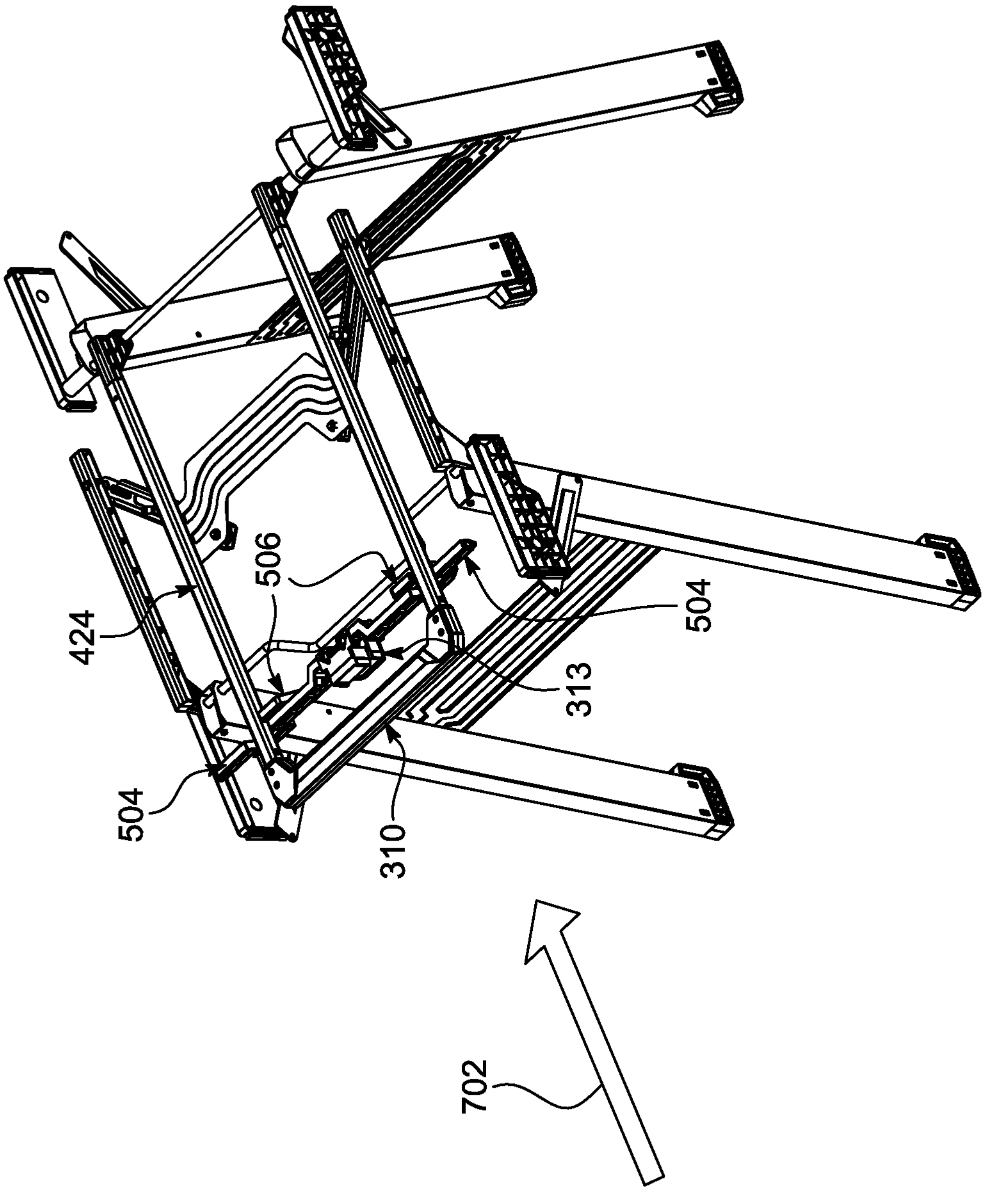
FIG. 7 shows the opened workbench of FIG. 6 for the explanation of the functions of some components.

FIG. 7 is similar to FIG. 6 but the telescopic handle system 310 is collapsed and the handle 310 is pushed back into the workbench 300. For this, the user presses actuator 313 in the direction 702 to cause arms 506 to extend outwardly and unlock the linear members 422 from the linear member 424, and subsequently pushes the linear members 422 into the linear members 424. During the collapse of the telescopic handle 310, the linear members 424 and correspondingly the legs 304 and 314 do not move at all.

Figure 8:
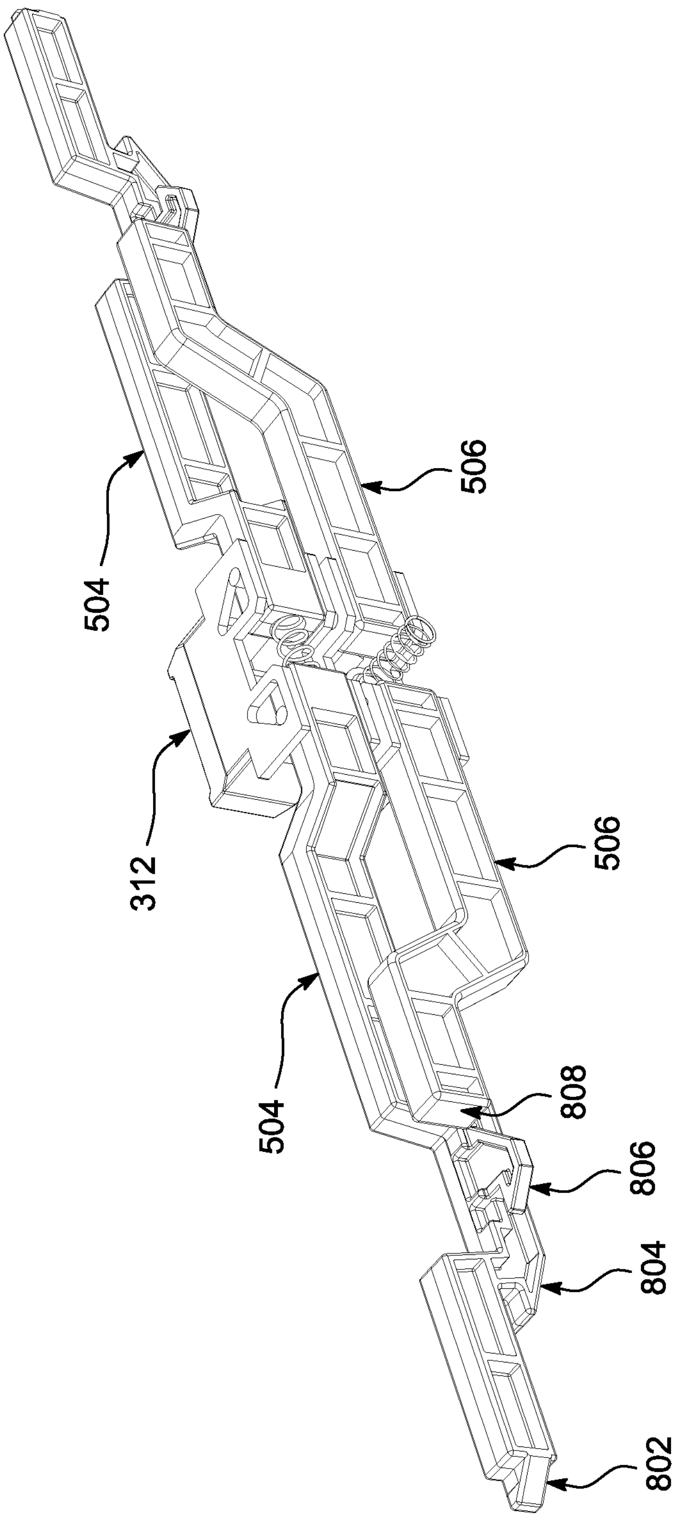
FIG. 8 shows example mechanisms for locking and unlocking of some components of the example workbench.

FIG. 8 is a clear view of the subsystems of the actuators 312 and 313 and illustrates arms 504 having three protrusions 802, 804, and 806 that are utilized to prevent the movement of various components of the workbench 300. In their default positions protrusions 802, 804, and 806, are ready to automatically engage with and lock the movement of various components that the protrusions become aligned with, such as in a folded or an unfolded state of the workbench 300. The detailed function of these protrusions will be discussed in the following paragraphs. While push-button 313 cannot be seen in FIG. 8, the arms 506, which are moveably attached to actuator 313 and are activated by actuator 313, are shown in this figure. Upon pressing actuator 313, the end faces 808 of arms 506 push the spring loaded pins 508 into linear members 422 and let the linear members 422 to slide into linear members 424. The purpose of the retraction of the linear members 422 into the linear members 424 is the ease of transportation and storage and the unobstructed use of the workbench 300.

Figure 9:
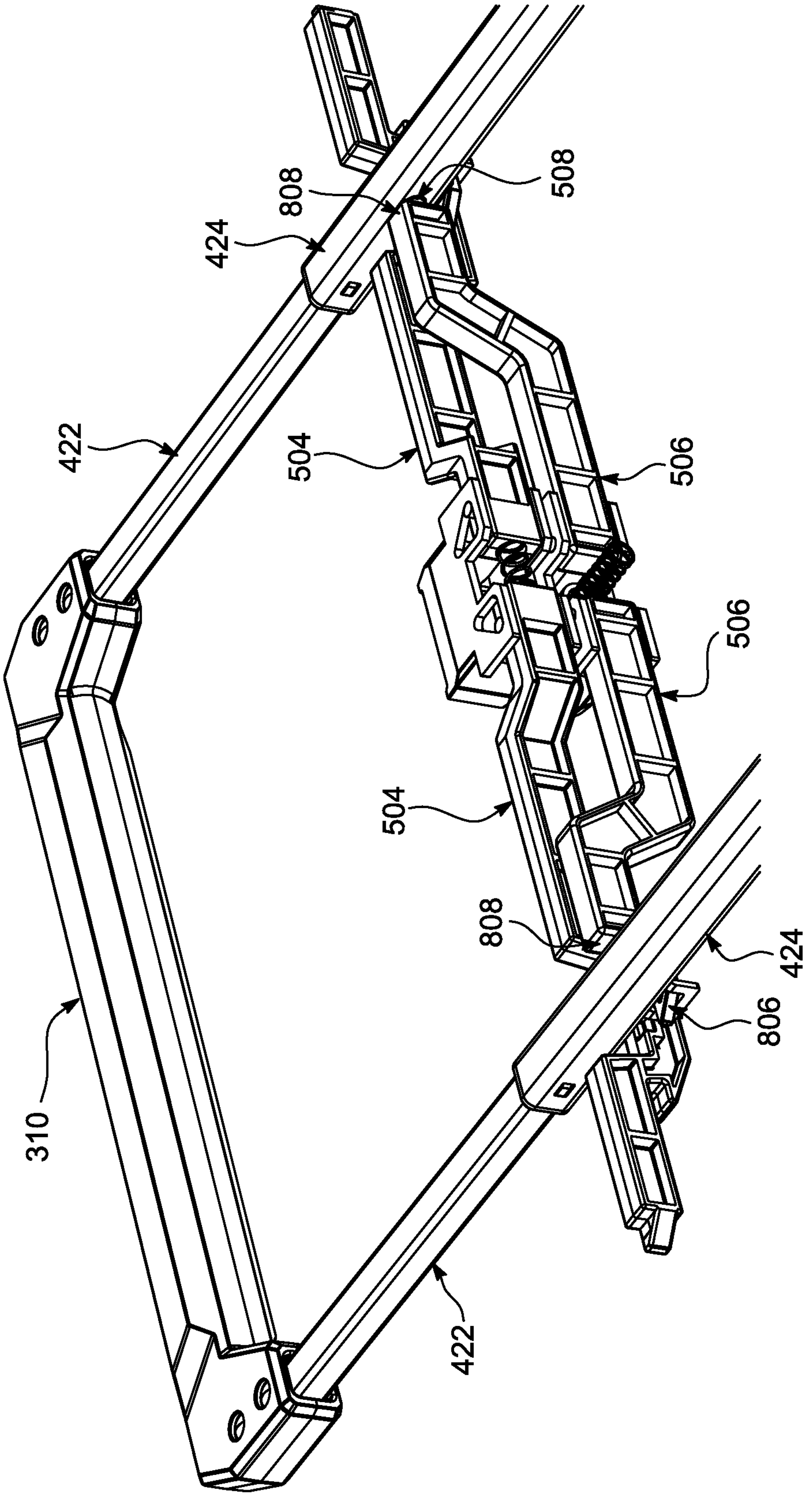
FIG. 9 shows the function of a part of the mechanisms illustrated in FIG. 8.

FIG. 9 illustrates the state of unfolding the workbench 300 in which handle 310 is all the way pulled out and protrusions 806 of arms 504 have locked linear members 424 in place and have consequently locked the unfolded legs of the workbench 300. FIG. 9 further shows the faces 808 of arms 506 being ready to push back spring-loaded pins 508 and allow the telescopic handle system 310 to collapse without altering the unfolded state of the workbench 300.

Figure 10:
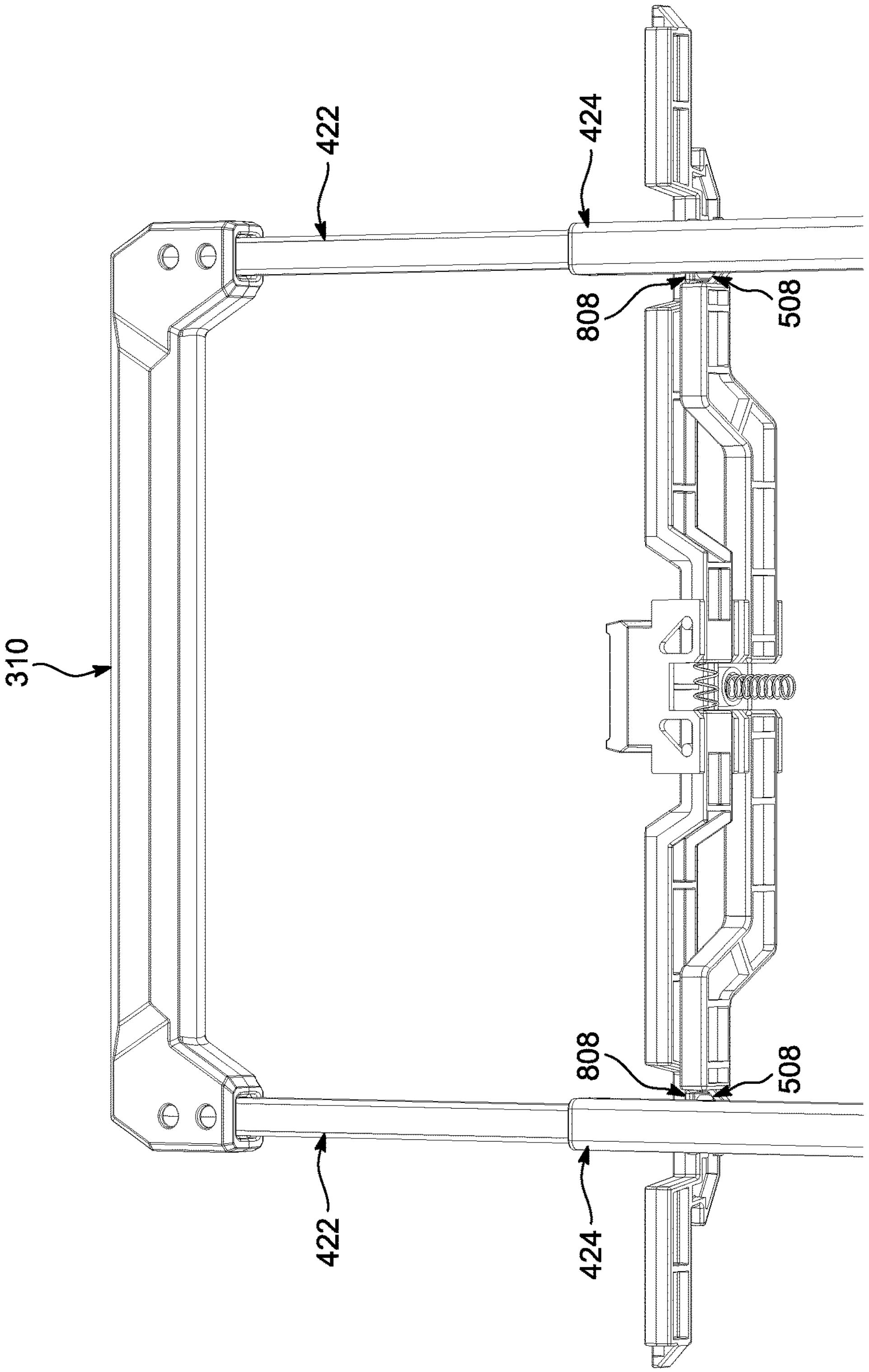
FIG. 10 shows the illustration of FIG. 9 from another angle.

FIG. 10 shows the mechanisms of FIG. 9 from another angle.

Figure 11:
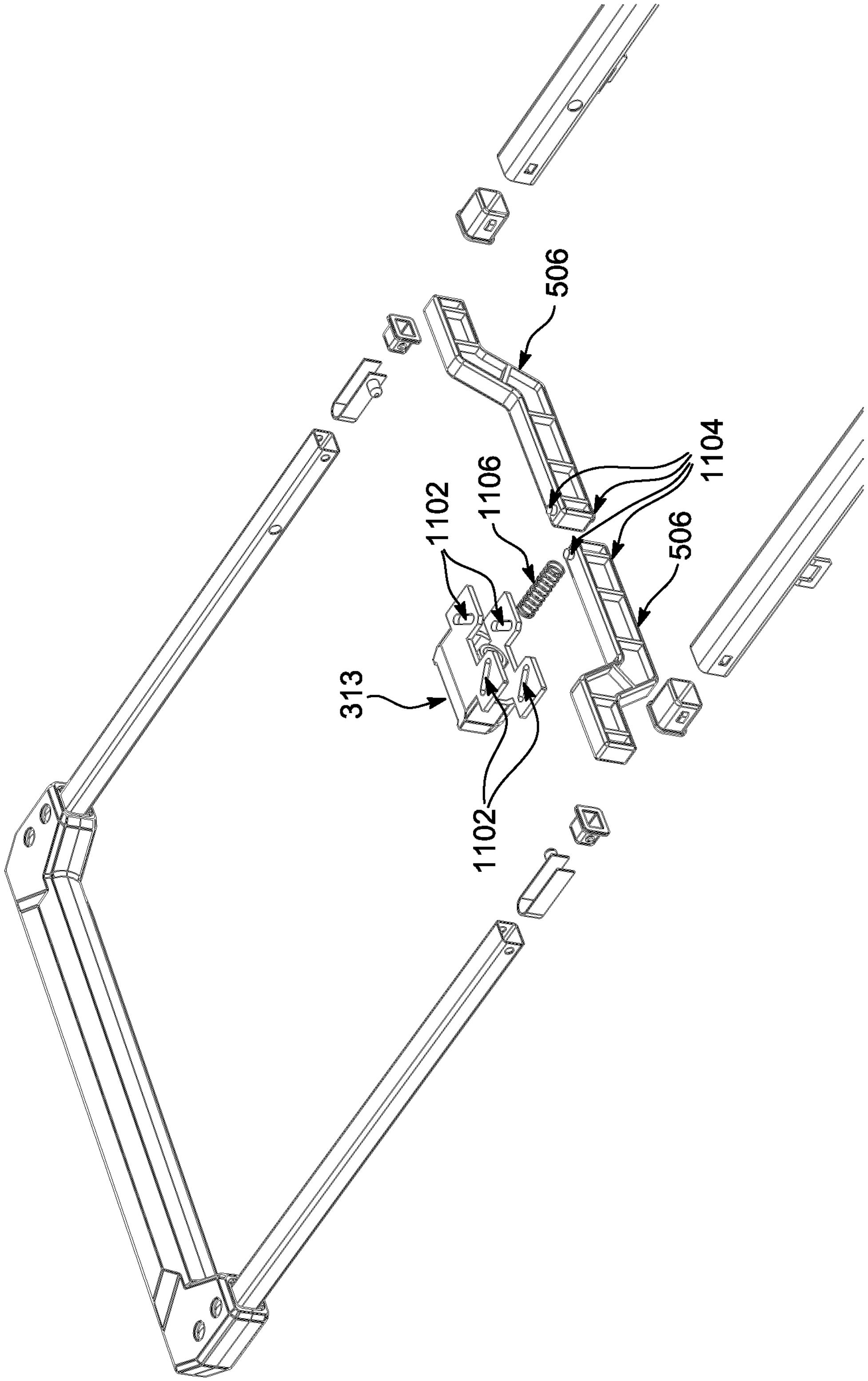
FIG. 11 illustrates an exploded view of one of the two mechanisms illustrated in FIG. 8.

FIG. 11 clearly illustrates the details of the subsystem associated with the actuator (unlocking actuator) 313. As shown in this exploded view, spring 1106 pushes the actuator 313 away from the arms 506 which causes the slots 1102 to move projections 1104 towards each other and consequently to pull arms 506 towards each other. This is the default position of arms 506. In contrast, pressing the actuator 313 causes slots 1102 to move projections 1104, and consequently arms 506, away from each other and press the spring-loaded pins 508 to unlock telescopic handle subsystem 310. The combination of each slot 1102 and its corresponding projection 1104 forms a cam-and-follower.

Figure 12:
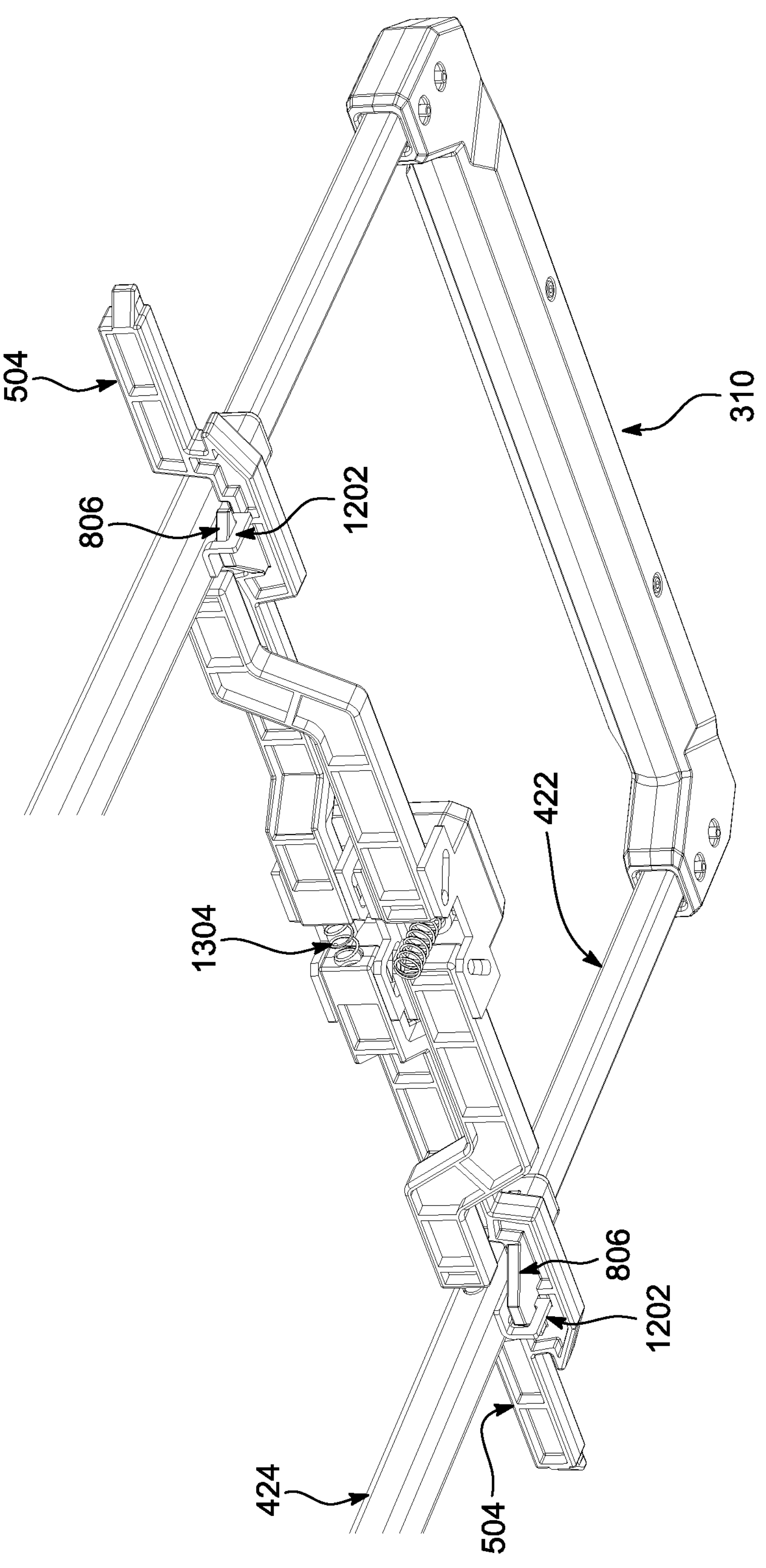
FIG. 12 shows the mechanisms illustrated in FIG. 8 from another angle.

FIG. 12 shows—looking up from under the workbench 300—the two subsystems of actuators 312 and 313 and the telescopic handle system 310. This figure concentrates on the mechanism of stopping the movements of the linear members 424 and consequently locking the folded or unfolded legs 304 and 314. As shown in this figure, for ease of manufacturing, one locking member 1202 is permanently attached to each of the linear members 424 which can mate with protrusions 806 of arms 504. Permanent attachment of a component to another means the two parts cannot be easily, readily, and quickly separated by a user or operator without tools and substantial effort. As was discussed above protrusions 806 are actuated by the actuator 312. Because in the default position arms 504 are extended outwardly by a spring 1304, pulling handle 310 will engage protrusions 806 with locking members 1202. Each of the protrusions 806 has an inclined surface which allows locking members 1202 to push protrusions 806 back and allow protrusions 806 to enter and pop into locking members 1202.

The components of the disclosed foldable workbench 300 is sized and positioned such that not to allow the linear members 424 to continue moving in the same direction after entering the locking members 1202. However, because the opposite side of the inclined surfaces (angled with respect to retraction arms 504) of the protrusions 806 is not sloped, protrusions 806 will not be able to move back out of the members 1202 either, even if one tries to push back the handle 310. Pushing back handle 310 and the linear members 424 is only possible after pressing actuator 312 which retracts retraction arms 504 toward each other and disengages protrusions 806 from locking members 1202. In this situation, when the linear members 424 is released and free to move, the handle 310 may be pushed to fold legs 304 and 314. Or a user can push the actuator or switch or push-button 313, unlock the linear members 422 from the linear members 424, and push back linear members 422 into the linear members 424 without moving the linear members 424 and the legs 304 and 314 from their locked positions.

Figure 13:
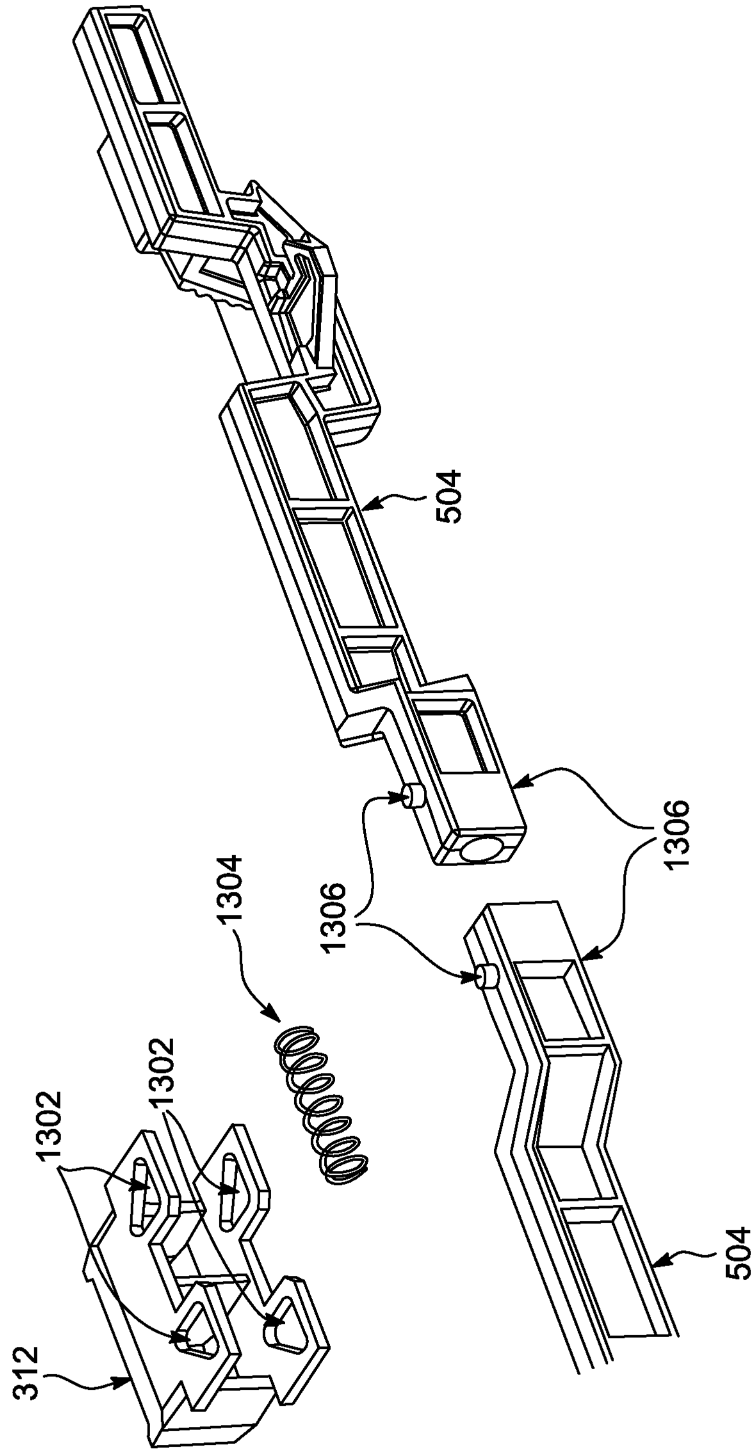
FIG. 13 illustrates an exploded view of the other mechanism illustrated in FIG. 8.

FIG. 13 illustrates the details of the subsystem associated with the actuator 312. As illustrated in this exploded view, spring 1304 pushes arms 504 away from each other. The resulting movement of projections 1306, which are free to move in slots 1302, will subsequently move actuator 312 away from arms 504. This may be considered as the default position of this subsystem. The combination of each slot 1302 and its corresponding projection 1306 forms a cam-and-follower. The subsystem shown in FIG. 13 is also called a locking actuator.

Figure 14:
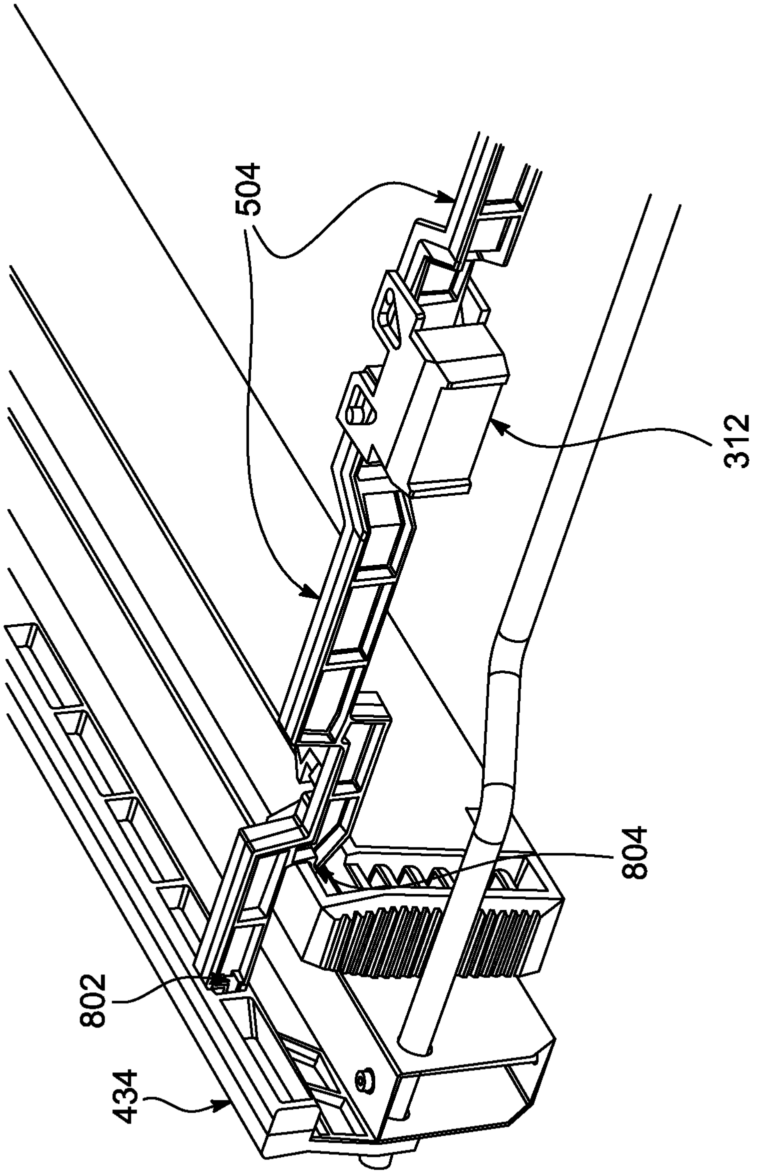
FIG. 14 illustrates more details of the locking mechanism shown in FIG. 8.

FIG. 14 illustrates the subsystem associated with the actuator or switch or push-button 312 and shows the functions of the protrusions 802 and 804. As is clearly shown, protrusions 804 are able to engage with and lock the legs 304 in their folded position. This alone locks and immobilizes the entire folding and unfolding system of workbench 300. Protrusion 802 can engage and restrain the movement of the solid members 434 while workbench 300 is in the folded state. In various embodiments protrusion 802 can engage with and lock the solid members 434 at different points along its length, which provides the possibility of locking the folding and unfolding systems of workbench 300 in several positions between the complete folded and the complete unfolded states. Both protrusions 802 and 804 have sloped surfaces that allows automatic engagement with the solid members 434 and with legs 304 in one direction only. However, to unlock and move solid members 434 and legs 304, protrusions 802, 804 and 806 may be retracted by pressing actuator 312 and bringing arms 504 toward each other. In various embodiments arms 504 may only lock the back or the front legs.

If slots 1302 are manufactured similar to slots 1102 and spring 1304 is eliminated, then actuator 312 may be used to manually lock and unlock the legs in any desired position.

Figure 15:
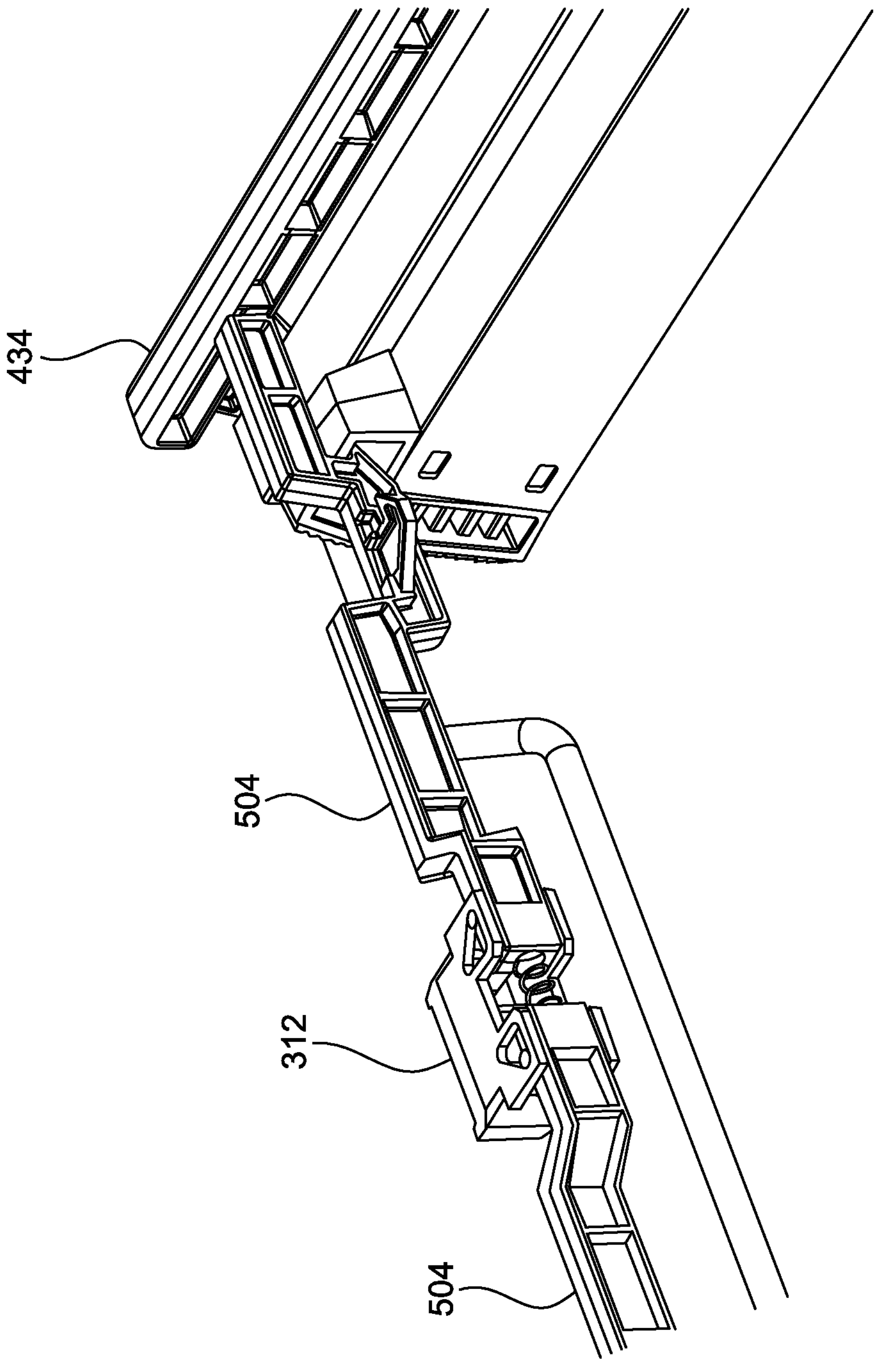
FIG. 15 illustrates the mechanism of FIG. 14 from another angle.

FIG. 15 shows the mechanism illustrated in FIG. 14 from another angle.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A foldable workbench, where legs of the workbench may be unfolded for using the workbench and be folded under the workbench for ease of transportation and storage, the foldable workbench comprising:
- a tabletop, including a top surface;
- at least one back leg;
- at least one front leg; and
- a handle subsystem having a direction-reversing linkage part and a handle part, wherein the handle part is rotatably attached to the at least one back leg and is attached to the at least one front leg through the direction-reversing linkage part, and wherein pulling the handle part away from the tabletop directly unfolds the at least one back leg while rotating the direction-reversing linkage part in a first direction to unfold the at least one front leg, and wherein pushing the handle part toward the tabletop directly folds the at least one back leg under the tabletop while rotating the direction-reversing linkage part in a second direction, which is opposite of the first direction, to fold the at least one front leg under the tabletop, and wherein the handle subsystem does not employ a rack-and-pinion or any gear-based mechanism.

2. The foldable workbench of claim 1, wherein each of the at least one back leg and the at least one front leg is attached to the tabletop by an additional bar in a two-bar linkage arrangement in which the leg is a first bar of the two-bar linkages and the additional bar is a second bar of the two-bar linkage and wherein one end of the second bar is rotatably attached to the tabletop and another end of the second bar is rotatably attached to the first bar and wherein one end of the first bar slides, using a rod, in a slot deployed within the tabletop and wherein none of the legs rotates around an actual or imaginary fixed point on the tabletop and wherein a plane of each of the two-bar linkages is substantially perpendicular to the top surface of the tabletop.

3. The foldable workbench of claim 2, wherein the handle part is directly attached to the rod of the at least one back leg and the rod of the at least one back leg follows the movements of the handle part and wherein the handle part is attached to the rod of the at least one front leg through a movement-reversing-mechanism that moves the rod of the at least one front leg in a direction opposite to the direction of the movements of the handle part.

4. The foldable workbench of claim 3, wherein the movement-reversing-mechanism includes an elongated member or bar rotatably attached to the tabletop, and wherein at one end the elongated member or bar is rotatably connected to a section of the handle part and at another end the elongated member or bar is connected to the sliding rod of the front legs and wherein the elongated member or bar is rotatably attached to the tabletop at a point between the two ends of the elongated member/bar.

5. The foldable workbench of claim 1, wherein the at least one back leg and the at least one front leg of the foldable workbench includes two back legs and two front legs and wherein the back legs are attached together and the front legs are attached together such that the two front legs cannot move relative to each other and the two back legs cannot move relative to each other.

6. The foldable workbench of claim 1, wherein during the folding and during the unfolding of the front and back legs of the foldable workbench, the front legs rotate in a direction opposite to the direction of the rotation of the back legs.

7. The foldable workbench of claim 1, wherein the handle part is telescopic and wherein pressing a push-button of an unlocking actuator subsystem unlocks the telescopic handle parts in order to collapse the expanded telescopic handle part and wherein the unlocking actuator subsystem employs a cam-and-follower mechanism.

8. The foldable workbench of claim 1, further including a locking actuator that automatically or manually locks the back and the front legs in their place when the legs are fully folded or are fully unfolded and wherein activating the locking actuator unlocks the back and front legs if locked and the locking actuator employs a cam-and-follower mechanism.

9. The foldable workbench of claim 1, wherein a component of a locking actuator locks the foldable workbench in a folded state by engaging and immobilizing the back and/or the front legs and wherein the locking actuator locks the foldable workbench in an unfolded state by engaging and immobilizing the handle part.

10. The foldable workbench of claim 1, wherein the tabletop is a box with top and side surfaces.

11. The foldable workbench of claim 1, wherein the handle of the handle subsystem is rotatably attached to the back leg and is connected to the front leg through two additional linkages.

12. A collapsible work table comprising:
- a tabletop;
- a back leg;
- a front leg;
- a telescopic handle having a handle grip, wherein the telescopic handle is rotatably attached to the back leg and is attached to the front leg through a direction-reversing linkage bar, and wherein pulling the handle grip away from the tabletop unfolds the front and the back legs away from the tabletop and pushing the handle grip toward the tabletop folds back the front and the back legs toward the tabletop, and wherein telescopic handle parts lock together when the telescopic handle is expanded and wherein mechanisms translating movements of the handle grip to movements of the legs do not employ a rack-and-pinion or any gear-based machinery;

a first push-button that is deactivated for locking and activated for unlocking the back and the front legs, with respect to the tabletop, in both folded and unfolded positions; and a second push-button that is activated for unlocking the telescopic handle parts, with respect to each other, in order to collapse the expanded telescopic handle.

13. The collapsible work table of claim 12, further comprising an additional front leg and an additional back leg, wherein neither the back legs nor the front legs rotates around a fixed point with respect to the tabletop and wherein each of the back legs and the front legs is attached to the tabletop with a side bar in a two-bar linkage arrangement and wherein one end of the side bar is rotatably attached to the tabletop and another end of the side bar is rotatably attached to a midpoint on the table leg and wherein a point on one end of the table leg moves in a straight line parallel to a tabletop plane.

14. The collapsible work table of claim 13, wherein a plane of the two-bar linkage is perpendicular to the tabletop plane.

15. The collapsible work table of claim 13, wherein the telescopic handle is rotatably attached to the end of the back legs that travels in a straight line and wherein the telescopic handle is rotatably connected to the end of the front legs that travels in the straight line via a movement-reversing-mechanism.

16. The collapsible work table of claim 15, wherein the movement-reversing-mechanism includes the direction-reversing linkage bar rotatably attached to the tabletop, and wherein at one end the direction-reversing linkage bar is rotatably attached to the telescopic handle and at another end the direction-reversing linkage bar is rotatably connected to the point of the front legs that travels in the straight line and wherein the direction-reversing linkage bar is rotatably attached to the tabletop at a point between where the telescopic handle is rotatably attached to the back legs and the rotatable connection to the front legs.

17. The collapsible work table of claim 15, wherein the telescopic handle further includes an extension part, and wherein handle grip telescopically travels inside the extension part and moves the extension part whenever the handle grip is locked to the extension part, and wherein the extension part is rotatably attached to an end of the back legs and also connected via the movement-reversing-mechanism to an end of the front legs, and wherein moving the extension part moves the front and the back legs, and locking the extension part with respect to the tabletop locks the front and the back legs with respect to the tabletop.

18. The collapsible work table of claim 17, wherein a component of the first push-button automatically locks the legs of the collapsible work table in a folded state by engaging and immobilizing the back legs and at a same time automatically engaging and immobilizing an attachment of the front legs and wherein the first push-button automatically locks the collapsible work table in an unfolded state by engaging and immobilizing the extension part of the telescopic handle and wherein pressing the first push-button unlocks the locked components in folded and unfolded positions.

19. The collapsible work table of claim 12, wherein the collapsible work table includes an additional back leg and an additional front leg.

20. The collapsible work table of claim 12, further comprising an additional front leg and an additional back leg, wherein during the folding and the unfolding of the legs, the front legs and the back legs rotate in opposite directions.

21. A telescopic handle for folding and unfolding legs of a foldable workbench that also includes a tabletop, the telescopic handle comprising:

an extension part, wherein the extension part is configured to be connected to the workbench legs and the extension part is configured to move with respect to the tabletop and configured to move the workbench legs with respect to the tabletop, and wherein the telescopic handle is rotatably attached to back legs and is attached to front legs through a direction-reversing linkage bar;

a handle part, wherein the handle part moves telescopically inside the extension part and, when locked to the extension part, moves the extension part along, and wherein the handle part locks to the extension part when the telescopic system of the telescopic handle is expanded;

a first push-button subsystem, configured to be attached to the tabletop, including a first switch and two lock-arms, wherein the first switch and the two lock arms have the relationship of a cam and two followers, respectively, and wherein the two lock-arms are designed to engage the extension part and immobilize the extension part with respect to the tabletop, and wherein pressing the first switch disengages the lock-arms from the extension part and unlocks the extension part from the tabletop; and a second push-button subsystem, configured to be attached to the tabletop, including a second switch and two unlocking-arms, wherein the second switch and the two unlocking-arms have the relationship of a cam and two followers, respectively, and wherein the two unlocking-arms are designed to unlock the extension part from the handle part when pressing the second switch.

22. The telescopic handle of claim 21, wherein the lock arms are spaced apart from each other in default position and are retracted toward each other when pressing the first switch.

23. The telescopic handle of claim 21, wherein the unlocking-arms stay retracted and close together in default position and are moved away from each other when pressing the second switch.

* * * * *